United States Patent
Ottinger et al.

(10) Patent No.: US 9,227,475 B2
(45) Date of Patent: Jan. 5, 2016

(54) METHOD FOR PRODUCING AN AIR GUIDE FOR A SUSPENSION ARM AND SUSPENSION ARM WITH AN AIR GUIDE

(71) Applicant: Audi AG, Ingolstadt (DE)

(72) Inventors: Andreas Ottinger, Rain/Überacker (DE); Hans-Jürgen Langhoff, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/242,383

(22) Filed: Apr. 1, 2014

(65) Prior Publication Data

US 2014/0306418 A1 Oct. 16, 2014

(30) Foreign Application Priority Data

Apr. 11, 2013 (DE) .......................... 10 2013 006 253

(51) Int. Cl.
| | |
|---|---|
| *B60G 7/02* | (2006.01) |
| *B60G 7/00* | (2006.01) |
| *B60T 5/00* | (2006.01) |
| *B62D 35/02* | (2006.01) |
| *F16D 65/80* | (2006.01) |
| *B62D 29/00* | (2006.01) |

(52) U.S. Cl.
CPC . *B60G 7/001* (2013.01); *B60T 5/00* (2013.01); *B62D 29/004* (2013.01); *B62D 35/02* (2013.01); *F16D 65/80* (2013.01); *B60G 2204/4308* (2013.01); *B60G 2206/014* (2013.01); *B60G 2206/10* (2013.01); *B60G 2206/16* (2013.01)

(58) Field of Classification Search
CPC ............ B60G 7/001; B60G 7/00; B60G 7/02; B60G 3/06; B60G 3/14; B60G 3/20; B60G 2206/10; B60G 2206/16; B60G 2206/014; B60G 2204/4308; B62D 29/004
USPC .................... 280/124.134, 124.135, 124.133, 280/124.132, 124.128, 124.153
See application file for complete search history.

(56) References Cited

U.S. PATENT DOCUMENTS

| | | | | |
|---|---|---|---|---|
| 4,883,287 | A * | 11/1989 | Murakami et al. ..... | 280/124.135 |
| 5,954,405 | A | 9/1999 | Toman | |
| 6,810,586 | B1 * | 11/2004 | Waaler et al. ................ | 29/897.2 |
| 7,654,544 | B2 * | 2/2010 | Lounsberry et al. ... | 280/124.134 |
| 7,938,417 | B2 | 5/2011 | Ersoy et al. | |
| 8,424,889 | B2 * | 4/2013 | Fujinuki ..................... | 280/124.1 |
| 8,616,570 | B2 | 12/2013 | Mielke et al. | |
| 8,905,437 | B2 * | 12/2014 | Tsuchiya ...................... | 280/781 |
| 2004/0045762 | A1 * | 3/2004 | Budde et al. .................. | 180/312 |
| 2005/0184481 | A1 * | 8/2005 | Tanaka et al. ........... | 280/124.134 |
| 2006/0175788 | A1 * | 8/2006 | Nuno et al. ............. | 280/124.153 |

(Continued)

FOREIGN PATENT DOCUMENTS

| | | |
|---|---|---|
| DE | 31 10 991 | 5/1982 |
| DE | 196 15 235 | 10/1997 |

(Continued)

*Primary Examiner* — James English
(74) *Attorney, Agent, or Firm* — Henry M. Feiereisen LLC

(57) ABSTRACT

Suspension arm 2 with an air guide 1, wherein the suspension arm 2 has in the installation position a downwardly open cross-sectional profile with a base surface 7 and at least two side webs 8 projecting from the base surface 7, and wherein the air guide 1 has a reinforcement element 3 to be arranged on the side webs 8 and an air guiding element 4 composed of a plastic material, and a method for producing an air guide 1 for a suspension arm 2.

16 Claims, 2 Drawing Sheets

(56) References Cited

U.S. PATENT DOCUMENTS

| | | |
|---|---|---|
| 2007/0009620 A1 | 1/2007 | Aoki et al. |
| 2007/0297850 A1* | 12/2007 | Morales Arnaez ............ 403/134 |
| 2009/0072506 A1* | 3/2009 | Jang et al. .............. 280/124.134 |
| 2009/0218776 A1* | 9/2009 | Whitacre et al. .......... 280/86.756 |
| 2010/0084834 A1* | 4/2010 | Ersoy et al. ................. 280/124.1 |
| 2011/0309652 A1 | 12/2011 | Eichentopf et al. |
| 2012/0021241 A1* | 1/2012 | Perry et al. .................... 428/594 |
| 2013/0154310 A1* | 6/2013 | Neumann et al. .............. 296/204 |
| 2013/0205591 A1* | 8/2013 | Santini et al. ................ 29/897.2 |
| 2014/0001725 A1* | 1/2014 | Matsumoto ............ 280/124.134 |
| 2014/0062050 A1* | 3/2014 | Williams et al. ....... 280/124.116 |

FOREIGN PATENT DOCUMENTS

| | | |
|---|---|---|
| DE | 102004003151 | 8/2005 |
| DE | 102004032471 | 1/2006 |
| DE | 102007015616 | 10/2008 |
| DE | 102010055824 | 6/2012 |
| EP | 0 778 187 | 6/1997 |
| EP | 2 535 213 | 8/2005 |
| EP | 2 455 244 | 5/2012 |
| WO | WO 2010/136460 | 12/2010 |

* cited by examiner

METHOD FOR PRODUCING AN AIR GUIDE FOR A SUSPENSION ARM AND SUSPENSION ARM WITH AN AIR GUIDE

CROSS-REFERENCES TO RELATED APPLICATIONS

This application claims the priority of German Patent Application, Serial No. 10 2013 006 253.5, filed Apr. 11, 2013, pursuant to 35 U.S.C. 119(a)-(d), the content of which is incorporated herein by reference in its entirety as if fully set forth herein.

BACKGROUND OF THE INVENTION

The present invention relates to a method for producing an air guide for a suspension arm, and a suspension arm with an air guide.

Such air guides are arranged in vehicle construction on suspension arms, also referred to as transverse control arms or simply control arms or wishbones, to achieve a better flow around the lower floor in the area of the wheel suspension. The wheel suspension connects the wheel to the body and guides it while allowing certain degrees of freedom. Suspension arms can be produced from formed (steel) sheets or from (reformed) extruded profiles, for example, from an extruded aluminum profile.

It would be desirable and advantageous to obviate prior art shortcomings and to provide an improved method for producing an air guide for a suspension arm and an improved suspension arm with an air guide which enables an increase in stiffness of the suspension arm while adding only little additional weight.

SUMMARY OF THE INVENTION

According to one aspect of the present invention, a method for producing an air guide for a suspension arm includes the following steps:
  providing a reinforcement element for placement on the suspension arm;
  overmolding the reinforcement element with an air guide element made of plastic.

By overmolding a reinforcement element with an air guide element made of plastic, a hybrid air guide having material properties adapted to the respective application can be produced. The reinforcement element is hereby more rigid than the air guide element so as to be able to increase the overall stiffness of the suspension arm when arranged on the suspension arm. The air guide element, however, does not require high stiffness, but should even be more resilient so as to be able to absorb flying gravel or other objects without being damaged. The air guide element can hence be formed from a thin lightweight plastic. The overall air guide is thus light, but improves the stiffness of the suspension arm when placed on the suspension arm.

According to an advantageous feature of the present invention, in a further method step, at least one receptacle for a fastener may be introduced in the reinforcing element. This method step can for example take place at the end of the process and be performed as a drilling operation. A straight aligned opening can be attained by drilling through the reinforcement element and possibly also through the air guide element that partially encases the reinforcement element. Alternatively, the receptacle can be already incorporated into the reinforcement element, for example, during casting or during wrapping with synthetic fibers.

According to another advantageous feature of the present invention, the reinforcement element may be made of a metal (steel, aluminum, magnesium, etc.). A metallic reinforcement element provides good stiffness properties at a reasonable cost and low processing complexity. The at least one receptacle for a fastener is in this case preferably implemented as a through hole, because the metallic reinforcement element can be easily machined.

According to another advantageous feature of the present invention, the reinforcement element may be made of a fiber-reinforced plastic. Suitable fiber-reinforced plastics are glass-fiber-reinforced plastic (FRP), carbon fiber-reinforced plastic (CFRP) or plastic with integrated short fibers. This type of plastic is much lighter than most metallic materials; however, costs and processing complexity increases.

According to another advantageous feature of the present invention, the at least one receptacle for a fastener may include a metal sleeve. The metallic sleeve is needed when the fastener comes into contact with plastic materials, because otherwise a sufficient tightening torque cannot be established. To secure the sleeve in the receptacle, its free ends can be flanged.

According to another advantageous feature of the present invention, the sleeve may be embedded in the reinforcement element during its manufacture. In an advantageous embodiment, for example, the sleeves may be fixed at the intended positions in an apparatus for subsequent wrapping with synthetic fibers. When the sleeves are arranged, for example, in form of a square, the diagonally opposed sleeves can be connected together with synthetic fibers, thereby producing a cross-shaped structure of the reinforcement element. The synthetic fibers are impregnated with resin, which then hardens.

According to another aspect of the invention, a suspension arm has an air guide, wherein the suspension arm has in the installation position a downwardly open cross-sectional profile, with a base surface and at least two side webs extending from the base surface, and wherein the air guide includes a reinforcement element for arranging on the side webs and an air guide element made of a plastic material.

The stiffness of the suspension arm may advantageously be increased considerably by connecting the downwardly open side webs of the suspension arm (Pi-shaped cross-sectional profile) to the reinforcement element of the air guide. The air guide element made of plastic which is also associated with the air guide is connected to the reinforcement element and is aerodynamically shaped in order to achieve good airflow around the undercarriage in the installation position of the suspension arm in the vehicle. The hybrid construction of the air guide achieves a excellent stiffening effect while also reducing the weight.

According to an advantageous feature of the suspension arm, the air guide element may be positively connected to the reinforcing element. The form-fit is preferably achieved by overmolding the reinforcement element together with the air guide.

According to another advantageous feature of the present invention, the reinforcement element may be frictionally held between the suspension arm and the reinforcement element. The injection molding process may advantageously be eliminated by clamping the air guide element between the suspension arm and the reinforcement element.

According to another advantageous feature of the present invention, the reinforcement element may be plate-shaped or cross-shaped. The shape of a cross provides a higher potential for reducing weight with the same stiffness properties than the simple plate shape.

According to another advantageous feature of the present invention, the reinforcement element may include at least one receptacle for a fastener embodied as a screw or a rivet. Attaching the reinforcement element with screws enables a releasable attachment to the suspension arm, which offers advantages for repairs. The rivet on the other hand reduces the installation space. In all cases, however, angled ends of the side webs are provided, in which the fastener can be introduced.

According to another advantageous feature of the present invention, the reinforcement element may be made of a fiber-reinforced plastic, wherein the receptacle is formed by a metallic sleeve. Suitable fiber-reinforced plastics are glass-fiber-reinforced plastic (FRP), carbon fiber-reinforced plastic (CFRP) or plastic with integrated short fibers. When selecting short fibers the reinforcing element and the air guiding element may be produced in a single injection operation, wherein short fibers are added to the reinforcement element to increase the stiffness. The metallic sleeve is required when the fastener comes into contact with plastic materials, because otherwise a sufficient tightening torque cannot be established. The ends of the sleeve can be flanged to secure the sleeve in the receptacle.

According to another advantageous feature of the present invention, the air guide element may be cup-shaped and protrude over the suspension arm in the transverse direction of the suspension arm. The cup shape not only creates good aerodynamic properties, but also protects the suspension arm from flying stones. The exact geometric configuration is determined by the individual situation.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
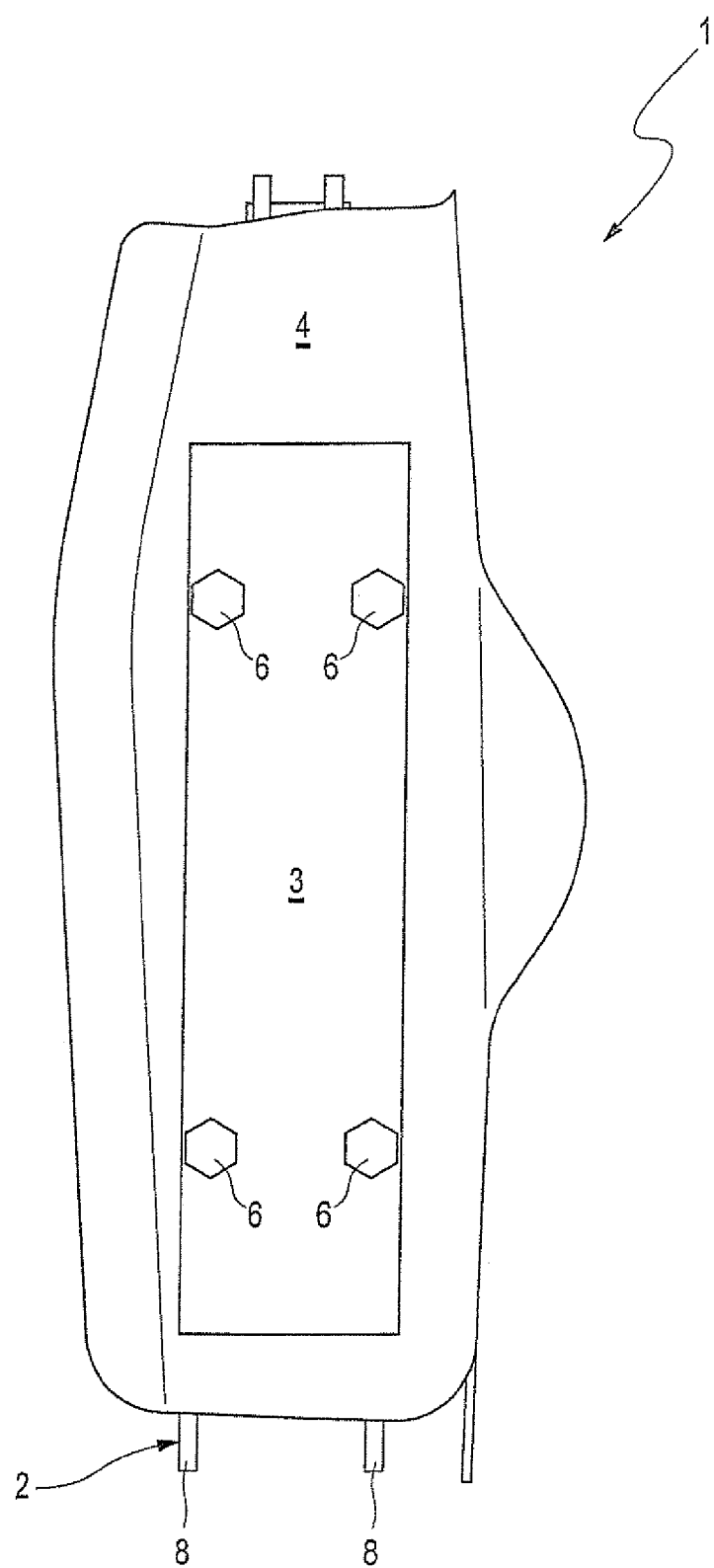
FIG. 1 a view from below of a suspension arm with an air guide.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an air guide 1 having a reinforcement element 3 with a cast air guide element 4 made of plastic. The reinforcement element 3 has a higher stiffness than the air guide element 4. The reinforcement element 3 may be attached to the suspension arm 2 with fasteners 6, thereby stiffening the suspension arm 2. The air guide element 4 is aerodynamically shaped so that it improves, when the suspension arm 2 is installed in the wheel suspension of a vehicle, the air flow in this region and protects the suspension arm 2 from stone impact.

Figure 2:
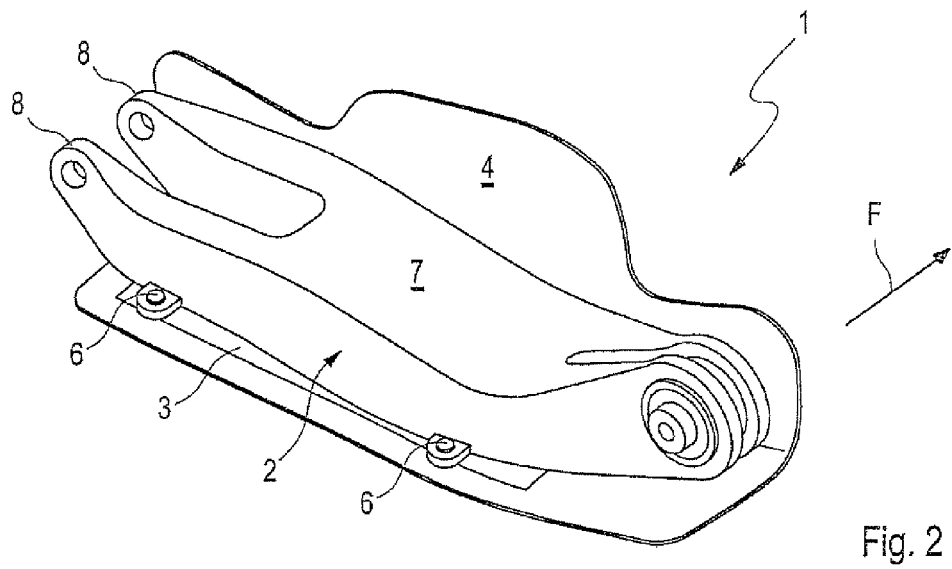
FIG. 2 an isometric view of a suspension arm with an air guide.

FIG. 2 shows the suspension arm 2, composed of a base surface 7 and two side webs 8 projecting substantially perpendicular from the base surface 7. The side webs 8 are angled at their lower end with respect to horizontal, allowing them to receive the fastener 6 for arrangement of the reinforcement element 3 of the air guide 1. The air guide 4 covers the suspension arm 2 in the direction of travel F.

Figure 3:
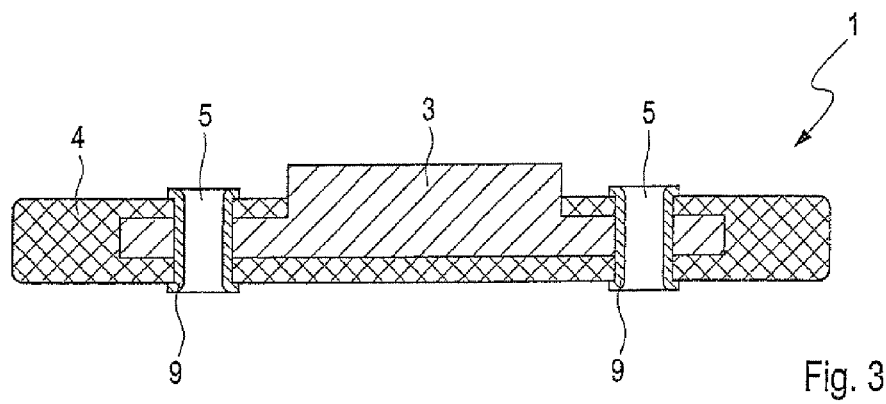
FIG. 3 a sectional view of a first embodiment of the air guide according to the present invention.

Referring to FIG. 3, a first embodiment of the air guide 1 has a metallic reinforcement element 3, which is overmolded with an air guide element 4 made of plastic. Through-holes serving as receptacles 5 for the fastener 6 are drilled in the so-formed semi-finished product. To ensure a certain fastening torque of the unillustrated fastener 6, a metallic sleeve 9 is inserted into the receptacles 5 and flanged for fixing the position of the free ends of the sleeve 9.

Figure 4:
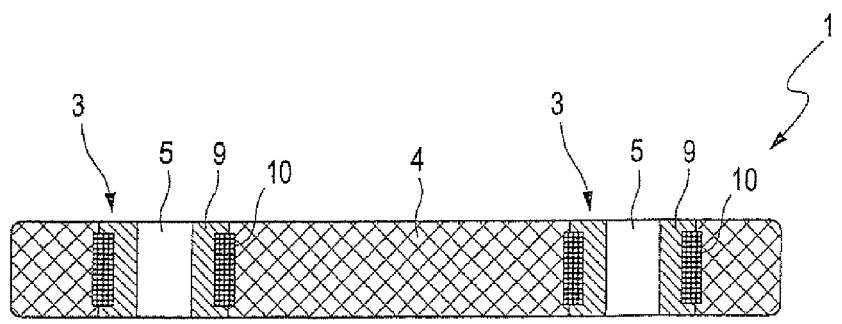
FIG. 4 a sectional view of a second embodiment of the air guide according to the present invention.

According to FIG. 4, a second embodiment of the air guide 1 has metallic sleeves 9 as receptacles 5 for unillustrated 6. The sleeves 9 are positioned and thereafter wrapped with synthetic fibers 10 of a fiber-reinforced plastic to form the reinforcing member 3. The synthetic fibers 10 are for this purpose impregnated with a resin and subsequently cured. The thus produced reinforcement element 3 is overmolded with an additional plastic to form the air guide element 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for producing an air guide for a suspension arm having a cross-sectional profile that is downwardly open in an installed position and comprises a base surface and at least two side webs projecting outwardly from the base surface and having lower ends, the method comprising:
   providing a reinforcement element to be arranged between the at least two side webs and immovably attached on the lower ends of the at least two side webs of the suspension arm; and
   overmolding the reinforcement element with an air guide element made of a plastic material,
   wherein the air guide element is immovably attached to the reinforcement element and covers at least one side of the reinforcement element in a transverse direction of the suspension arm and protrudes from the reinforcement element in the transverse direction.

2. The method according to claim 1, further comprising introducing at least one receptacle for a fastener in the reinforcement element.

3. The method of claim 1, wherein the reinforcement element is composed of a metal.

4. The method of claim 2, wherein the reinforcement element is composed of a metal and the at least one receptacle is constructed as a through bore.

5. The method according to claim 1, wherein the reinforcement element is composed of a fiber-reinforced plastic.

6. The method of claim 2, wherein the at least one receptacle comprises a metallic sleeve.

7. The method of claim 6, wherein the metallic sleeve is embedded in the reinforcement element during its manufacture.

8. A suspension arm for a vehicle comprising:
   a cross-sectional profile that is downwardly open in an installed position and comprises a base surface and at least two side webs projecting outwardly from the base surface and having lower ends, and
   an air guide comprising a reinforcement element arranged between the at least two side webs and immovably attached to the lower ends of the at least two side webs, and an air guide element composed of a plastic material and immovably attached to the reinforcement element and covering at least one side of the reinforcement element in a transverse direction of the suspension arm and protruding from the reinforcement element in the transverse direction.

9. The suspension arm of claim 8, wherein the air guide element is positively connected to the reinforcing element.

10. The suspension arm of claim 8, wherein the air guide element is frictionally held between the suspension arm and the reinforcement element.

11. The suspension arm of claim 8, wherein the reinforcement element is shaped as a plate or shaped as a cross.

12. The suspension arm of claim 8, wherein the reinforcement element comprises at least one receptacle configured to accommodate a fastener.

13. The suspension arm of claim 12, wherein the fastener is as least one of a screw and a rivet.

14. The suspension arm of claim 12, wherein the reinforcement element is composed of a fiber-reinforced plastic material, and the at least one receptacle is constructed from a metallic sleeve.

15. The suspension arm of claim 8, wherein the air guide element is shaped as a cup and extends beyond the suspension arm in a transverse direction of the suspension arm.

16. The suspension arm of claim 8, wherein the air guide element covers at least the downwardly open profile of the suspension arm in a direction of travel of the vehicle.

* * * * *